US010871192B2

(12) United States Patent
Brogna et al.

(10) Patent No.: US 10,871,192 B2
(45) Date of Patent: Dec. 22, 2020

(54) FLANGED INNER RING FOR ORBITAL FORMING OPERATION

(71) Applicant: Aktiebolaget SKF, Gothenburg (SE)

(72) Inventors: Daniele Brogna, Venaria Reale (IT); Domenico Bruno, Turin (IT); Fulvio Nicastri, Garzigliana (IT); Davide Antonio Olivieri, Turin (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 16/683,732

(22) Filed: Nov. 14, 2019

(65) Prior Publication Data

US 2020/0158177 A1 May 21, 2020

(30) Foreign Application Priority Data

Nov. 15, 2018 (IT) .......................... 102018000010333

(51) Int. Cl.
*F16C 43/04* (2006.01)
*F16C 33/60* (2006.01)
*F16C 19/18* (2006.01)

(52) U.S. Cl.
CPC ............ *F16C 33/605* (2013.01); *F16C 19/18* (2013.01); *F16C 2326/02* (2013.01)

(58) Field of Classification Search
CPC .. F16C 19/186; F16C 2326/02; F16C 43/086; B60B 27/0084
See application file for complete search history.

(56) References Cited

U.S. PATENT DOCUMENTS

| 7,677,807 | B2* | 3/2010 | Chifu ..................... B60B 27/00 384/544 |
| 7,960,846 | B2* | 6/2011 | Katagiri .................. H01L 24/50 257/784 |
| 9,315,069 | B2* | 4/2016 | Komori ............... B60B 27/0084 |
| 2002/0051597 | A1 | 5/2002 | Sera et al. |
| 2003/0016894 | A1* | 1/2003 | Miyazaki ............ B60B 27/0084 384/544 |

(Continued)

FOREIGN PATENT DOCUMENTS

| DE | 10200080004924 | 7/2009 |
| JP | 2002139060 | 5/2002 |

(Continued)

OTHER PUBLICATIONS

International Search Report for corresponding Italy Application No. 2018000010333 dated Jul. 31, 2019.

*Primary Examiner* — Phillip A Johnson
(74) *Attorney, Agent, or Firm* — Reed Smith LLP

(57) ABSTRACT

A flanged inner ring, and methods of forming the same, having a rolling edge configured to preload axially a radially inner ring of a rolling bearing after being plastically deformed; the rolling edge including a diameter of increasing variable size along an axis (X) of symmetry of the flanged inner ring and, wherein the increasing variable size increases along the axis (X) in a direction away from the radially inner ring, and the rolling edge includes an outer preloading surface configured such that in a deformed configuration the outer preloading surface is arranged against the radially inner ring and such that in an undeformed configuration the outer preloading surface is inclined away from the axis (X) of symmetry of the flanged inner ring.

20 Claims, 3 Drawing Sheets

(56) References Cited

U.S. PATENT DOCUMENTS

2008/0148893 A1\* 6/2008 Langer .................... F16D 1/072
  74/434
2009/0028485 A1 1/2009 Norimatsu et al.

FOREIGN PATENT DOCUMENTS

| JP | 2007127242 | 5/2007 | |
|---|---|---|---|
| JP | 2007154931 | 6/2007 | |
| JP | 2007211795 | 8/2007 | |
| JP | 4058821 B2 \* | 3/2008 | .............. F16C 43/04 |
| JP | 4239249 B2 \* | 3/2009 | ............ F16C 19/186 |
| JP | 4807775 B2 \* | 11/2011 | .............. F16C 43/04 |
| WO | 20060105748 | 10/2006 | |

\* cited by examiner

FLANGED INNER RING FOR ORBITAL FORMING OPERATION

CROSS-REFERENCE TO RELATED APPLICATION

This application claims the benefit of priority to Italian Application No. 102018000010333 of the same title filed on Nov. 15, 2018, under 35 U.S.C. § 119 and/or 35 U.S.C. § 120, the entire contents of which are incorporated herein by reference.

TECHNICAL FIELD

The example embodiments disclosed herein relate to a flanged inner ring of a rolling bearing forming part of a wheel hub assembly, which are optimized to improve the orbital forming operation.

BACKGROUND

Generally, an orbital forming operation is performed by means of a press tool. Once the orbital forming operation has been completed, and in order to obtain a desired deformation of an edge and the consequent preloading of an inner ring, the press tool exerts a very high load on a rolled edge of the hub or the flanged inner ring. This, in-turn, naturally has an impact, both on the tensioned state and on the deformation of the inner ring, and consequently on the size of its diameter DK, which tends to increase in size.

As such, there exists a need to design a flanged inner ring of a wheel hub assembly for performing orbital forming, which does not have the aforementioned drawbacks.

DETAILED DESCRIPTION

The example embodiments in accordance with this disclosure are suitable for wheel hub assemblies of motor vehicles, wherein the assemblies being provided with a rolling bearing. These applications comprise both the case where the outer ring of the bearing is rotating, while the inner ring of the bearing is fixed, and the opposite case where the inner ring rotates and the outer ring is fixed. The example embodiments are also suitable, for example, for any type of rolling body (balls, rollers, tapered rollers, etc.).

Figure 1:
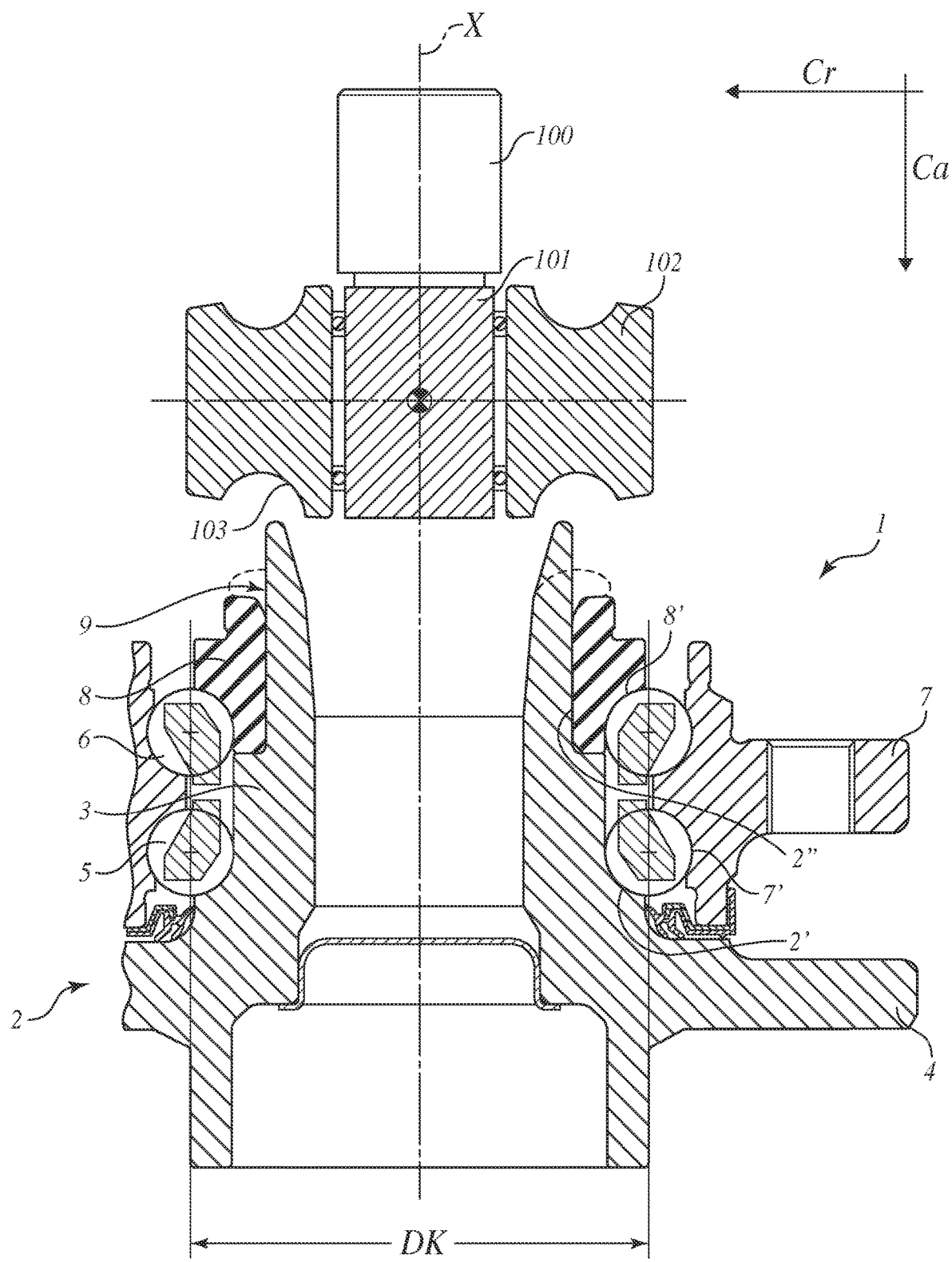
FIG. 1 shows a partial axial-symmetric cross-sectional view during the operation of orbital forming of a flanged inner ring.

With reference to FIG. 1, a wheel hub assembly 1 is illustrated. In various applications of wheel hub assemblies 1, the hub 2 has an axis of symmetry X and comprises a cylindrical body 3 coaxial with the axis X, and a flanged portion 4 integral with the cylindrical body. The flanged portion 4 being transverse to the axis X, and axially on the outside for connecting the wheel hub 1 to a vehicle wheel. The hub 2 forms one of the rotating elements of the bearing unit and is configured to also assume the function of an inner rolling ring of the bearing. For these reasons, such a hub 2 is also called a flanged inner ring and during the course of the present description it will be referred to in either one of these two ways.

Normally wheel hub assemblies 1 are provided with a bearing unit having two rows 5, 6 of rolling bodies, which roll along respective raceways 7' of an outer ring 7, which in most cases is stationary, and along respective raceways 2', 8' of the inner rings, which in most cases are rotating.

As mentioned and illustrated, the hub 2 assumes the function of an inner ring, in an axially outer position, while a second inner ring 8, which is separate from the hub 2, is mounted on the same hub 2, and in particular, on a radially outer surface 2" thereof.

The hub 2 has, at its axially inner end, a rolled edge 9 which, after being deformed by means of a plastic machining operation, referred to as orbital forming, is configured to close axially the bearing unit and to preload axially the inner ring 8. The rolled edge 9 is shown, in solid lines, in its un-deformed configuration where it is arranged around and coaxial with the axis X and, in broken lines, in its deformed configuration, where it is arranged axially against the inner ring 8.

The orbital forming operation is performed by means of a tool, schematically shown in FIG. 1 and denoted overall by 100. The tool, as illustrated, includes a cylindrical body 101, an annular press portion 102 with a pressing surface 103 which, following a circular path around the axis X, deforms incrementally the rolled edge 9 from the un-deformed configuration into the deformed configuration.

Once the orbital forming operation has been completed, the radially outer diameter DK of the inner ring 8 increases significantly in size precisely because of the machining operation. In fact, in order to obtain the desired deformation of the edge and the consequent preloading of the inner ring 8, the press tool must exert on the rolled edge 9 of the hub or flanged inner ring a very high load. Doing so, naturally has an impact both on the tensioned state and on the deformation of the inner ring 8 and consequently on the size of its diameter DK, which therefore tends to increase.

The object of the example embodiments according to the present disclosure is to provide a flanged inner ring that is able not only to reduce the deformation of the small inner ring of the bearing unit of a wheel hub assembly, but also to improve the axial preload acting on the small ring once orbital forming has been concluded. The deformation of the small inner ring of the bearing unit of the wheel hub assembly being induced by the orbital forming process carried out on the rolling edge of the flanged inner ring.

Therefore, according to the example embodiments disclosed herein, a flanged ring of a wheel hub assembly provided with a rolling edge optimized for the orbital forming operation and having the characteristic features illustrated in the independent claim annexed to the present description is described.

Further, the advantageous embodiments disclosed herein are described in accordance with the characteristic features recited in the claims.

Figure 2:
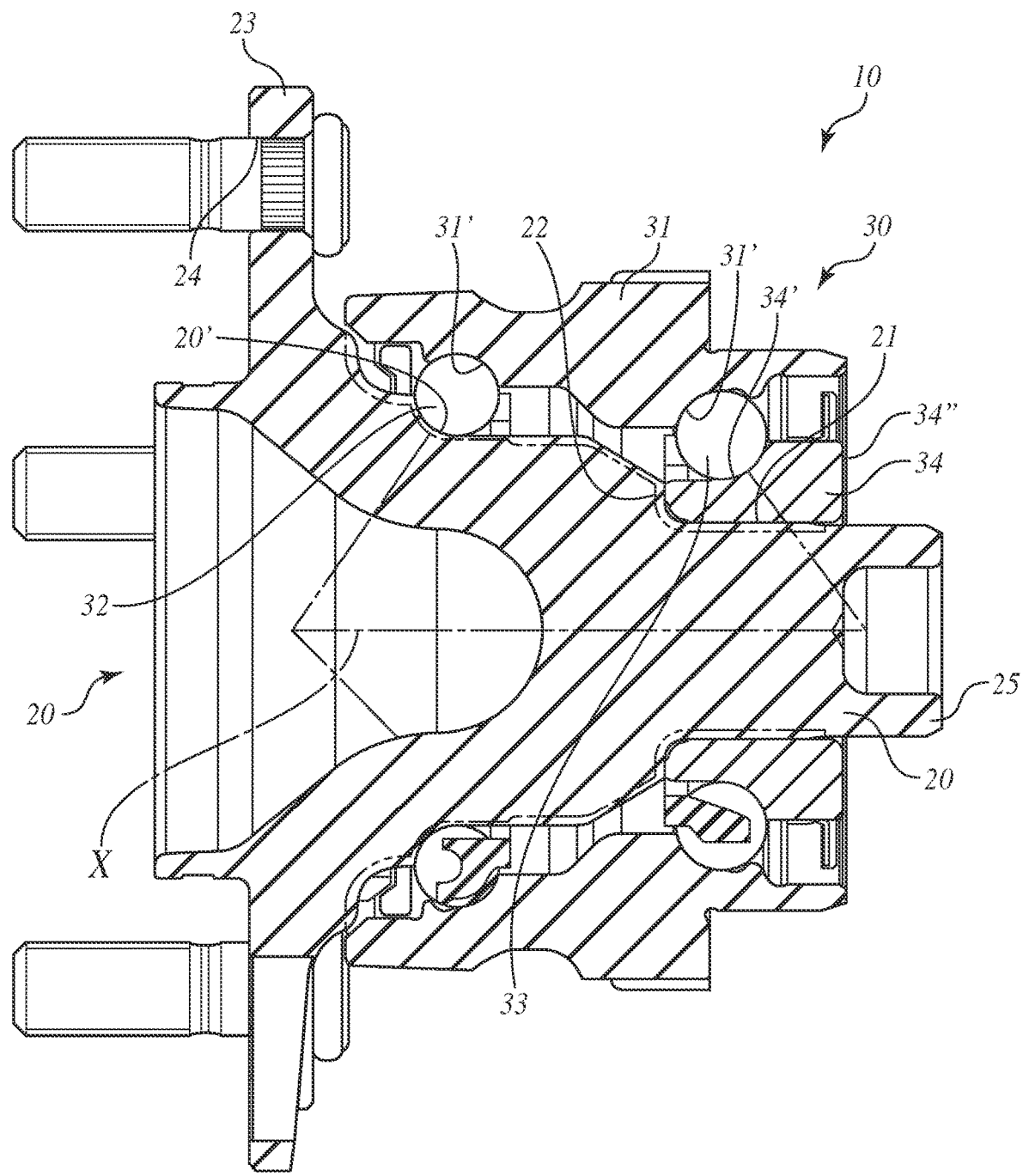
FIG. 2 shows a partial axial-symmetric cross-sectional view of an assembled wheel hub assembly, before execution of the orbital forming operation according to an example embodiment of this disclosure.

With reference now to FIG. 2, a wheel hub assembly according to an example embodiment is denoted overall by 10. The figure shows a detailed view of the wheel hub assembly according to an example configuration. The example embodiment discussed herein is applicable not only to the configuration described below, but more generally to any wheel hub assembly for motor vehicles.

The wheel hub assembly 10 comprises a hub 20 which is preferably, but not necessarily, rotatable and a bearing unit 30. The hub 20 is configured to assume also the function of an inner rolling ring of the bearing 30 and, for this reason, is also called or referred to as a flanged inner ring.

In the whole of the present description and in the claims, the terms and expressions indicating positions and orientations such as "radial" and "axial" are understood as referring to the central axis X of rotation of the bearing unit 30. Expressions such as "axially outer" and "axially inner" refer instead to the assembled condition and, in the specific case, preferably refer to a wheel side and, respectively, to a side opposite to the wheel side.

The bearing unit 30 may comprise a radially outer ring 31, which—may be stationary and provided with respective raceways 31'; a radially inner ring which, as described above, may correspond to the hub 20; and a further radially inner ring 34, which is mounted on a cylindrical radially outer surface 21 of the hub 20 axially next to a shoulder 22 formed in the hub 20, and is axially bounded on the opposite to the shoulder by an outer annular surface 34" transverse to the axis X.

Both the hub 20 and the radially inner ring 34 are rotatable and are provided with respective raceways 20', 34' for housing, together with the raceways 31', two rows of rolling bodies 32, 33, in this example balls, forming part of the bearing 30. The row of axially outer rolling bodies 32 is arranged between the radially outer ring 31 and the hub 20 having the function of radially inner ring, while the row of axially inner rolling bodies 33 is arranged between the radially outer ring 31 and the radially inner ring 34. For ease of illustration, the reference numbers 32, 33 will be used to identify both the single balls and the rows of balls. The term "ball" may be used by way of example in the present description and in the attached drawings instead of the more generic term "rolling body" (and likewise the same reference numbers will also be used). It will be understood that, instead of balls, any other rolling body (for example, rollers, tapered rollers, needle rollers, etc.) may be used.

Figure 3:
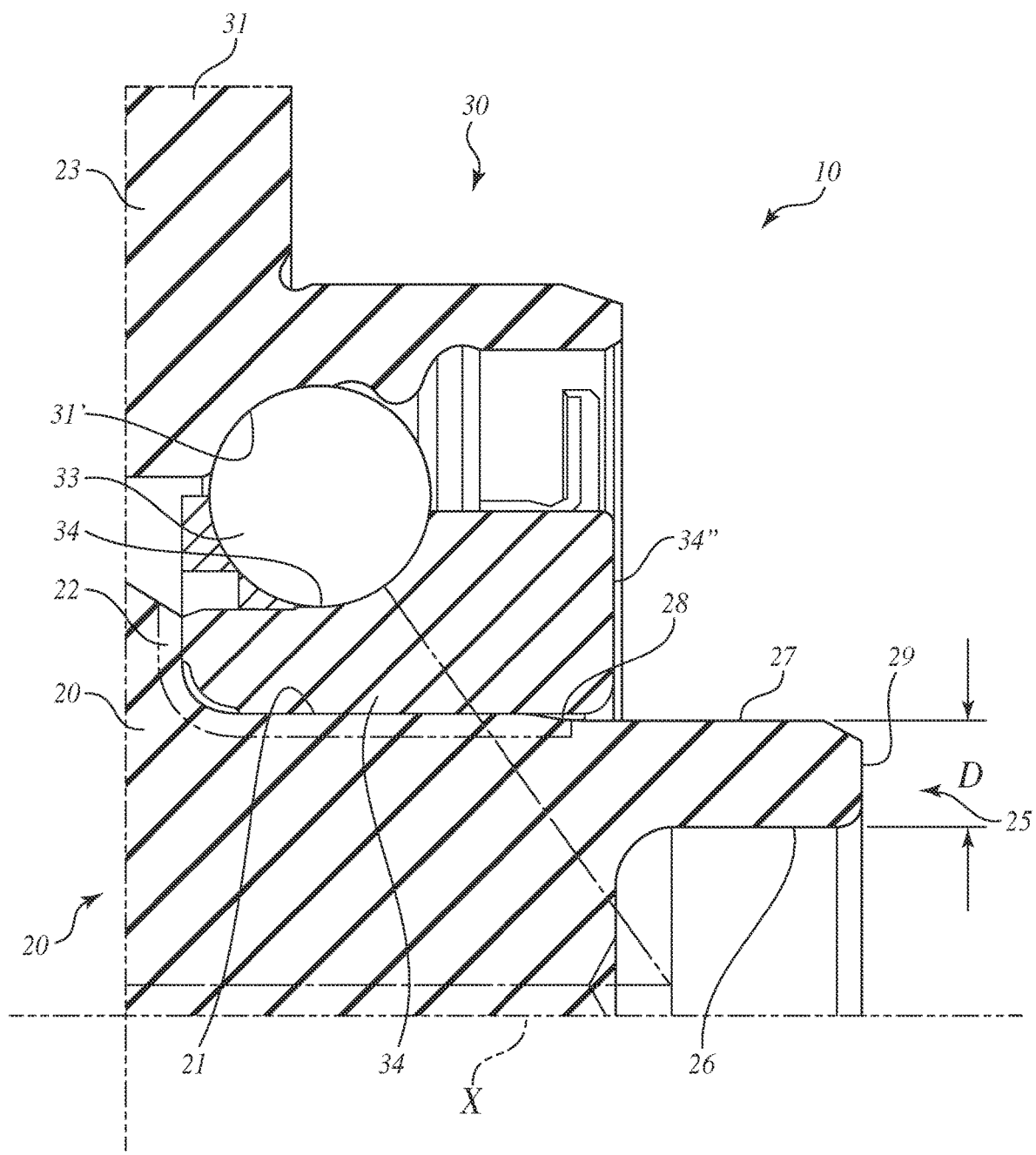
FIG. 3 is a view, on a larger scale, of a detail of the wheel hub assembly according to FIG. 1.

The hub 20 may comprise an axially outer flanged portion 23 provided with a plurality of fixing holes 24 for a corresponding number of fixing elements 24', for example stud bolts, which connect in a known manner the hub 20 to a wheel of the motor vehicle; and axially on the opposite side to the flanged portion 23, a tubular portion 25 which is shown, in FIGS. 2 and 3, in its undeformed configuration, where it extends around and is coaxial with the axis X substantially protruding at least from the outer annular surface 34" of the radially inner ring 34. The tubular portion 25, which can also be called rolling edge, is designed to be rolled by means of a plastic machining operation, called orbital forming, into a deformed configuration thereof similar to that of the rolled edge 9 described above, axially against the radially inner ring 34 so as to close axially the bearing unit 30, lock the said radially inner ring 34 against the shoulder 22 and impart to the radially inner ring 34 an axial preload of given magnitude.

As shown more clearly in FIG. 3, according to an example embodiment the tubular portion 25 may be optimized—in order to have a smaller increase in the outer diameter DK of the radially inner ring 34 as a result of the deformation induced by the tubular portion 25 during rolling and a smaller rolling force.

The tubular portion 25 illustrated in FIG. 3 is bounded radially inward by a cylindrical surface 26 coaxial with the axis X and outwardly by a preloading surface 27, which is axially aligned with the radially outer surface 21 to which it is connected via an outwardly convex and curved connecting surface 28 and, at least along the connecting surface 28, may have a diameter smaller in size than a diameter of the radially outer surface 21. The preloading surface 27 may have a variable diameter along the axis X and, in particular, is a conical surface, the diameter D of which increases in size along the axis X in the direction away from the inner ring 34, namely its conicity widens at the exit end of the connecting surface 28, resulting in a gradual increase in a radial thickness of said tubular portion 25. The preloading surface 27 and the cylindrical surface 26 are both axially bounded on the opposite side to the bearing 30 by an annular connecting surface 29, which is transverse to the axis X and chamfered towards the preloading surface 27 and is connected to the cylindrical surface 26.

According to an example embodiment, the conicity of the surface 27 is that the tubular portion 25 may be deformed starting from sections with a smaller radial thickness, i.e., those which are situated substantially along the connecting surface 28 and which, under the thrusting force of the forming tool 100, tend to be deformed first, and then gradually proceeding, as the tubular portion 25 is compressed against the inner ring 34, towards sections with a larger radial thickness. Thus, an axial thrust along the axis X of the forming tool 100 may be essentially broken down into two components, namely, a direct radial component Cr perpendicular to the axis X, and an axial component Ca directed along the axis X.

Both the components Cr and Ca may be influenced by the configuration and shape of the tubular portion 25; owing to this configuration it is possible at the same time: to reduce to a minimum the radial component Cr to the advantage of the axial component Ca, in particular at the end of the orbital forming operation; and control the action of the axial component Ca on the tubular portion 25, resulting in the deformation thereof and controlling the deformation of the radially inner ring 34.

Owing to the reduction of the radial component Cr and the precise control of the axial component Ca made possible by the innovative form of the tubular portion 25 it is possible to calibrate the action of the forming tool 100 so as to have solely an axial component Ca at the end of the plastic orbital forming operation, with near zeroing of the radial component Cr, and therefore elimination of any negative influence on the size of the radial outer diameter DK of the inner ring 34. In fact, owing to its conical form, during the orbital forming process, the deformation of the tubular portion 25 will proceed, starting from the sections with a smaller size radial thickness. That is, those in the vicinity of the inner ring 34, and gradually reaching the sections with a larger radial thickness. This favors the flow of the material from the undeformed position into the final deformed configuration of the tubular portion 25 allowing, moreover, the axial preload thrust to be distributed on the inner ring 34 from the zones where there is more material to the zones where there is less material to be deformed.

All of the dimensional optimizations described above and modifications may result in a greater deformability of the tubular portion 25 with all the advantages described above.

In addition to the example embodiments of this disclosure, as described above, it is to be understood that numerous further variants are possible. It may also be understood that the embodiments are only examples, and do not limit the subject of the inventive concepts, nor its applications, nor its possible configurations. On the contrary, although the description provided above enables the person skilled in the art to implement the present inventive concepts at least in one of its examples of configuration, it must be understood that numerous variations of the components described herein are conceivable, without thereby departing from the scope of the example embodiments, as defined in the accompanying claims, interpreted literally and/or in accordance with their legal equivalents.

What is claimed is:

1. A flanged inner ring, comprising:
a rolling edge configured to axially preloaded a radially inner ring of a rolling bearing after being plastically deformed,
wherein,
the rolling edge includes a diameter of increasing variable size along an axis (X) of symmetry of the flanged inner ring and, wherein the increasing variable size increases along the axis (X) in a direction away from the radially inner ring,
wherein the rolling edge includes an outer preloading surface configured such that in a deformed configuration the outer preloading surface is arranged against the radially inner ring and such that in an undeformed configuration the outer preloading surface is inclined away from the axis (X) of symmetry of the flanged inner ring.

2. The flanged inner ring of claim 1, wherein the outer preloading surface is axially aligned with a radially outer surface for mounting the radially inner ring, and is connected to the radially outer surface via a connecting surface, the outer preloading surface includes a diameter smaller in size than a diameter of the radially outer surface at least along the connecting surface.

3. The flanged inner ring of claim 2, wherein the outer preloading surface is a conical surface, and the rolling edge includes a radial thickness which is gradually thicker along the axis (X) of symmetry in the direction away from the inner ring.

4. The flanged inner ring of claim 1, wherein the rolling edge further includes an inner cylindrical surface coaxial with the axis (X) of symmetry.

5. The flanged inner ring of claim 4, wherein the rolling edge further includes an annular connecting surface connecting the outer preloading surface and the inner cylindrical surface.

6. The flanged inner ring of claim 5, wherein the annular connecting surface extends in a direction transverse to the axis (X) of symmetry.

7. The flanged inner ring of claim 6, wherein the annular connecting surface is chamfered towards the outer preloading surface.

8. The flanged inner ring of claim 1, further comprising an axially outer flange portion configured to be connected to a wheel.

9. The flanged inner ring of claim 1, further comprising at least one raceway on an axially outer surface of the flanged inner ring.

10. The flanged inner ring of claim 1, further comprising a shoulder formed on an axially outer surface of the flanged inner ring, wherein the rolling edge is configured to preload the radially inner ring against the shoulder.

11. A flanged inner ring, comprising:
a rolling edge configured to axially preloaded a radially inner ring of a rolling bearing after being plastically deformed,
wherein, the rolling edge includes a diameter of increasing variable size along an axis (X) of symmetry of the flanged inner ring and, wherein the increasing variable size increases along the axis (X) in a direction away from the radially inner ring,
wherein
the rolling edge includes an outer preloading surface configured such that in a deformed configuration the outer preloading surface is arranged against the radially inner ring and such that in an undeformed configuration the outer preloading surface is inclined away from the axis (X) of symmetry of the flanged inner ring;
wherein the rolling edge further includes an inner cylindrical surface coaxial with the axis (X) of symmetry.

12. The flanged inner ring of claim 11, wherein the outer preloading surface is axially aligned with a radially outer surface for mounting the radially inner ring, and is connected to the radially outer surface via a connecting surface, the outer preloading surface includes a diameter smaller in size than a diameter of the radially outer surface at least along the connecting surface.

13. The flanged inner ring of claim 12, wherein the outer preloading surface is a conical surface, and the rolling edge includes a radial thickness which is gradually thicker along the axis (X) of symmetry in the direction away from the inner ring.

14. The flanged inner ring of claim 11, wherein the rolling edge further includes an annular connecting surface connecting the outer preloading surface and the inner cylindrical surface.

15. The flanged inner ring of claim 14, wherein the annular connecting surface extends in a direction transverse to the axis (X) of symmetry.

16. The flanged inner ring of claim 15, wherein the annular connecting surface is chamfered towards the outer preloading surface.

17. The flanged inner ring of claim 11, further comprising an axially outer flange portion configured to be connected to a wheel.

18. The flanged inner ring of claim 11, further comprising at least one raceway on an axially outer surface of the flanged inner ring.

19. The flanged inner ring of claim 11, further comprising a shoulder formed on an axially outer surface of the flanged inner ring, wherein the rolling edge is configured to preload the radially inner ring against the shoulder.

20. A flanged inner ring, comprising:
a rolling edge configured to axially preloaded a radially inner ring of a rolling bearing after being plastically deformed,
wherein,
the rolling edge includes a diameter of increasing variable size along an axis (X) of symmetry of the flanged inner ring and, wherein the increasing variable size increases along the axis (X) in a direction away from the radially inner ring,
wherein the rolling edge includes an outer preloading surface configured such that in a deformed configuration the outer preloading surface is arranged against the radially inner ring and such that in an undeformed configuration the outer preloading surface is inclined away from the axis (X) of symmetry of the flanged inner ring;
wherein the rolling edge further includes an inner cylindrical surface coaxial with the axis (X) of symmetry, and further wherein the rolling edge further includes an annular connecting surface connecting the outer preloading surface and the inner cylindrical surface, the annular connecting surface extends in a direction transverse to the axis (X) of symmetry, and the annular connecting surface is chamfered towards the outer preloading surface.

* * * * *